(12) United States Patent
Oh

(10) Patent No.: US 8,847,901 B2
(45) Date of Patent: Sep. 30, 2014

(54) LABELING TOUCH REGIONS OF A DISPLAY DEVICE

(75) Inventor: Seung-Seok Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 316 days.

(21) Appl. No.: 13/412,247

(22) Filed: Mar. 5, 2012

(65) Prior Publication Data

US 2013/0141344 A1 Jun. 6, 2013

(30) Foreign Application Priority Data

Dec. 6, 2011 (KR) ........................ 10-2011-0129891

(51) Int. Cl.
*G06F 3/041* (2006.01)

(52) U.S. Cl.
USPC ........................................ 345/173; 178/18.01

(58) Field of Classification Search
CPC ............................................. G06F 2203/04104
USPC .................... 345/173–183; 178/18.01–18.11, 178/19.01–19.07, 20.01–20.04; 715/863
See application file for complete search history.

(56) References Cited

U.S. PATENT DOCUMENTS

| | | | | |
|---|---|---|---|---|
| 7,663,607 B2 * | 2/2010 | Hotelling et al. | ............. | 345/173 |
| 8,416,209 B2 * | 4/2013 | Hotelling et al. | ............. | 345/173 |
| 8,493,355 B2 * | 7/2013 | Geaghan et al. | ............. | 345/174 |
| 8,553,003 B2 * | 10/2013 | Hashimoto et al. | ........... | 345/173 |
| 8,587,559 B2 * | 11/2013 | Gandhi et al. | ................ | 345/175 |
| 2006/0097991 A1 * | 5/2006 | Hotelling et al. | ............. | 345/173 |
| 2009/0066670 A1 * | 3/2009 | Hotelling et al. | ............. | 345/174 |
| 2009/0085894 A1 * | 4/2009 | Gandhi et al. | ................ | 345/175 |
| 2009/0095540 A1 | 4/2009 | Zachut et al. | | |
| 2009/0096757 A1 * | 4/2009 | Hotelling et al. | ............. | 345/173 |
| 2009/0284495 A1 * | 11/2009 | Geaghan et al. | ............. | 345/174 |
| 2010/0253642 A1 | 10/2010 | Tsuzaki et al. | | |
| 2011/0012864 A1 * | 1/2011 | Lin | ............................ | 345/174 |
| 2011/0050640 A1 * | 3/2011 | Lundback et al. | ............ | 345/175 |
| 2011/0055729 A1 * | 3/2011 | Mason et al. | ................. | 715/753 |
| 2012/0044204 A1 * | 2/2012 | Hashimoto et al. | ........... | 345/174 |
| 2012/0062474 A1 * | 3/2012 | Weishaupt et al. | ........... | 345/173 |
| 2012/0105371 A1 * | 5/2012 | Hotelling et al. | ............. | 345/174 |
| 2012/0188201 A1 * | 7/2012 | Binstead | ........................ | 345/174 |
| 2012/0194452 A1 * | 8/2012 | Cho et al. | ........................ | 345/173 |
| 2013/0106733 A1 * | 5/2013 | Wang et al. | .................... | 345/173 |

FOREIGN PATENT DOCUMENTS

| | | |
|---|---|---|
| JP | S61-145689 A | 7/1986 |
| JP | H07-175925 A | 7/1995 |
| JP | 2000-242798 A | 9/2000 |
| JP | 2005-276030 A | 10/2005 |

(Continued)

OTHER PUBLICATIONS

United Kingdom Intellectual Property Office, Search and Examination Report, United Kingdom Patent Application No. GB 1214701.3, Dec. 17, 2012, eight pages.

*Primary Examiner* — Gene W Lee
(74) *Attorney, Agent, or Firm* — Fenwick & West LLP

(57) ABSTRACT

The embodiments herein relate to a method and device for labeling a touch region, in which adjacent raw data are labeled in groups for reducing a labeling time period as well as a memory size for storing the labeled data.

18 Claims, 9 Drawing Sheets

(56) References Cited

FOREIGN PATENT DOCUMENTS

| | | |
|---|---|---|
| JP | 2005-339444 A | 12/2005 |
| JP | 2007-128497 A | 5/2007 |
| JP | 2008-097172 A | 4/2008 |
| JP | 2008-299474 A | 12/2008 |
| JP | 2009-116769 A | 5/2009 |
| JP | 2010-039732 A | 2/2010 |
| WO | WO 2010/016411 | 2/2010 |

* cited by examiner

| 0 | 0 | 0 | 0 | 0 | 0 |
|---|---|---|---|---|---|
| 0 | 1 | 0 | 1 | 0 | 0 |
| 0 | 1 | 1 | 1 | 0 | 0 |
| 0 | 0 | 1 | 0 | 0 | 0 |
| 0 | 0 | 0 | 0 | 1 | 1 |
| 0 | 0 | 0 | 0 | 1 | 1 |

\<Binary Raw Data\>

FIG. 4

FIG.5A  <Initial labeling>

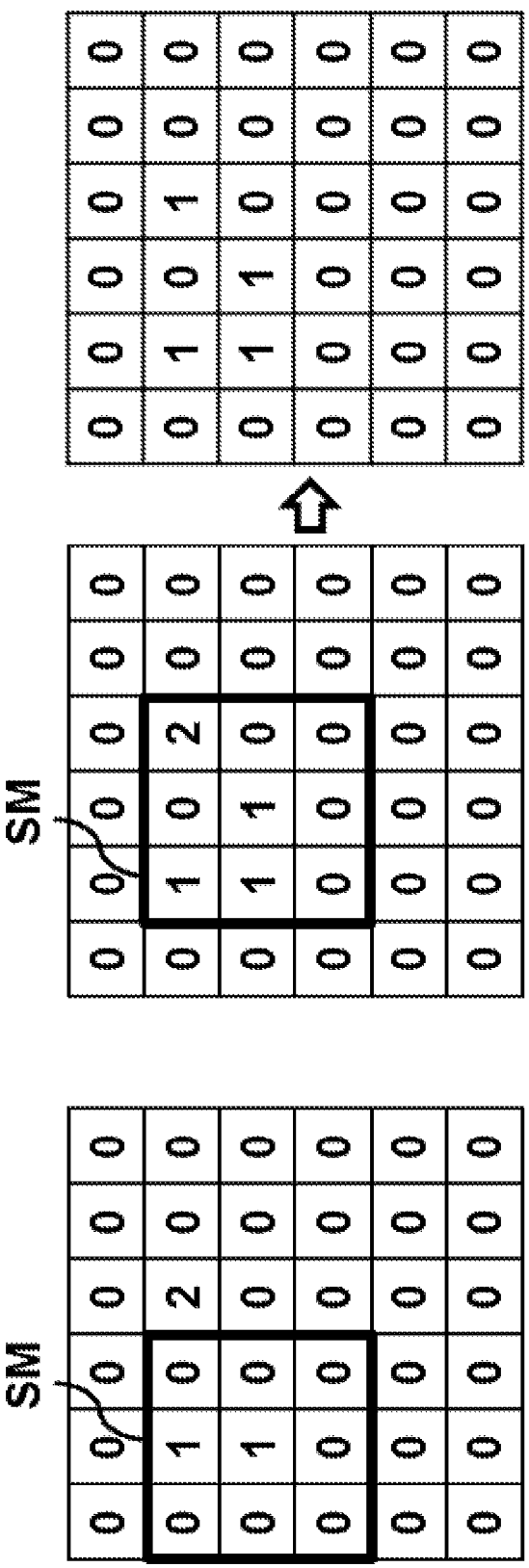

<Label Data>

<After Labeling>

LABELING TOUCH REGIONS OF A DISPLAY DEVICE

CROSS REFERENCE TO RELATED APPLICATIONS

This application claims the benefit under 35 U.S.C. 119(a) of Korean Patent Application No. 10-2011-0129891, filed on Dec. 6, 2011, which is incorporated by reference in its entirety.

BACKGROUND OF THE DISCLOSURE

1. Technical Field

The embodiments disclosed herein generally relate to a device for driving a touch sensor. More specifically, the embodiments herein relate to a method and device for labeling a touch region of a display device which can reduce the time required for sensing multi-touch as well as reduce the required memory size for the touch region labeling.

2. Discussion of the Related Art

A touch sensor receives information as a result of a user touching a screen of various display devices. Touch sensors are widely applied to computer systems as an information input device. Touch sensors enables users to move or select displayed information by simple touch of the screen with a finger or a stylus.

The touch sensor senses a touch and a position on the screen of the display device corresponding to the touch. The touch sensor provides the touch information to a computer system that analyzes the touch information to carry out an associated action. Depending on sensing principles, in touch sensing technologies, there are various types of touch sensors such as a resistance membrane type, a capacitive type, optical type, an infrared type, an ultrasonic type, and an electromagnetic type.

The touch sensor may be an on-cell touch sensor which is fabricated in a display panel and attached on an upper side of the display device, or an in-cell touch sensor which is built in a pixel matrix of the display device. A photo touch sensor perceives touch with a photo-transistor according to intensity of a light whereas a capacitive touch sensor perceives touch according to capacitive variation.

SUMMARY OF THE DISCLOSURE

The embodiments disclosed herein are directed to a method and device including a touch sensor for labeling a touch region. During the labeling of a touch region, adjacent raw data are labeled in groups or clusters for reducing the time required to determine the labels as well as for reducing a memory size for storing the labeled data.

In one or more embodiments, a method for labeling a touch region includes storing binary raw data for each touch node of a touch sensor, the binary raw data indicating whether a touch is made or not, and assigning label data to the raw data having the touch while scanning the raw data in succession. In one embodiment, assigning label data to the raw data having the touch includes comparing target raw data having the touch to an adjacent label data within a preset scanning mask while scanning the raw data with the scanning mask.

In one or more embodiments, if there is a label data adjacent to the target raw data within the scanning mask, the adjacent label data is assigned to the target raw data having the touch. If there is no label data adjacent to the target raw data within the scanning mask, sequential label data is assigned to the target raw data having the touch. In one embodiment, assigning label data to the raw data having the touch further comprises assigning the first label data having a lowest value from the first label data and second label data to the target raw data and updating the second label data with the first label data if the first label data and second label data are different from each other and adjacent to the target raw data within the scanning mask.

In one or more embodiments, a device for driving a touch sensor includes a touch sensor, a touch controller for driving the touch sensor, detecting and storing binary raw data on each touch node of the touch sensor from a readout signal from the touch sensor, assigning a label data to the raw data associated with a touch while scanning the raw data in succession, grouping adjacent raw data having the touches into touch regions, calculating coordinates of each touch region, and forwarding the coordinates. The touch controller may compare a target raw data having the touch to an adjacent label data within a preset scanning mask while scanning the raw data with the scanning mask. The controller assigns the same adjacent label data to the target raw data having the touch if there is a label data adjacent to the target raw data within the scanning mask, and assigns sequential label data to the target raw data having the touch if there is no label data adjacent to the target raw data within the scanning mask.

In one or more embodiments, if the first label data and the second label data are different from each other and adjacent to the target raw data having the touch within the scanning mask, the touch controller assigns the first label data having a smallest value in the first and second label data to the target raw data having the touch and updates the second label data with the first label data. The label data may have a memory size that is the same size as the raw data. In one embodiment, the touch controller stores the raw data after adding a dummy frame data to edges of one frame of the raw data.

In one or more embodiments, the scanning mask may have a mask size of N×M (where, N and M are the same or different positive integers) cells. A scanning mask may comprise a center cell and a plurality of cells scanned before the center cell in the N×M cells. Each cell in the scanning mask may correspond to raw data, and the center cell of the scanning mask matches to the target raw data.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 4 illustrates a raw data frame used in a touch region labeling in accordance with one embodiment.

FIGS. 5A, 5B, 5C, 5D, 5E, and 5F illustrate a touch region labeling process in accordance with one embodiment.

The drawings depict, and the detail description describes, various non-limiting embodiments for purposes of illustration only. One skilled in the art will readily recognize from the following discussion that alternative embodiments of the structures and methods illustrated herein may be employed without departing from the principles described herein.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
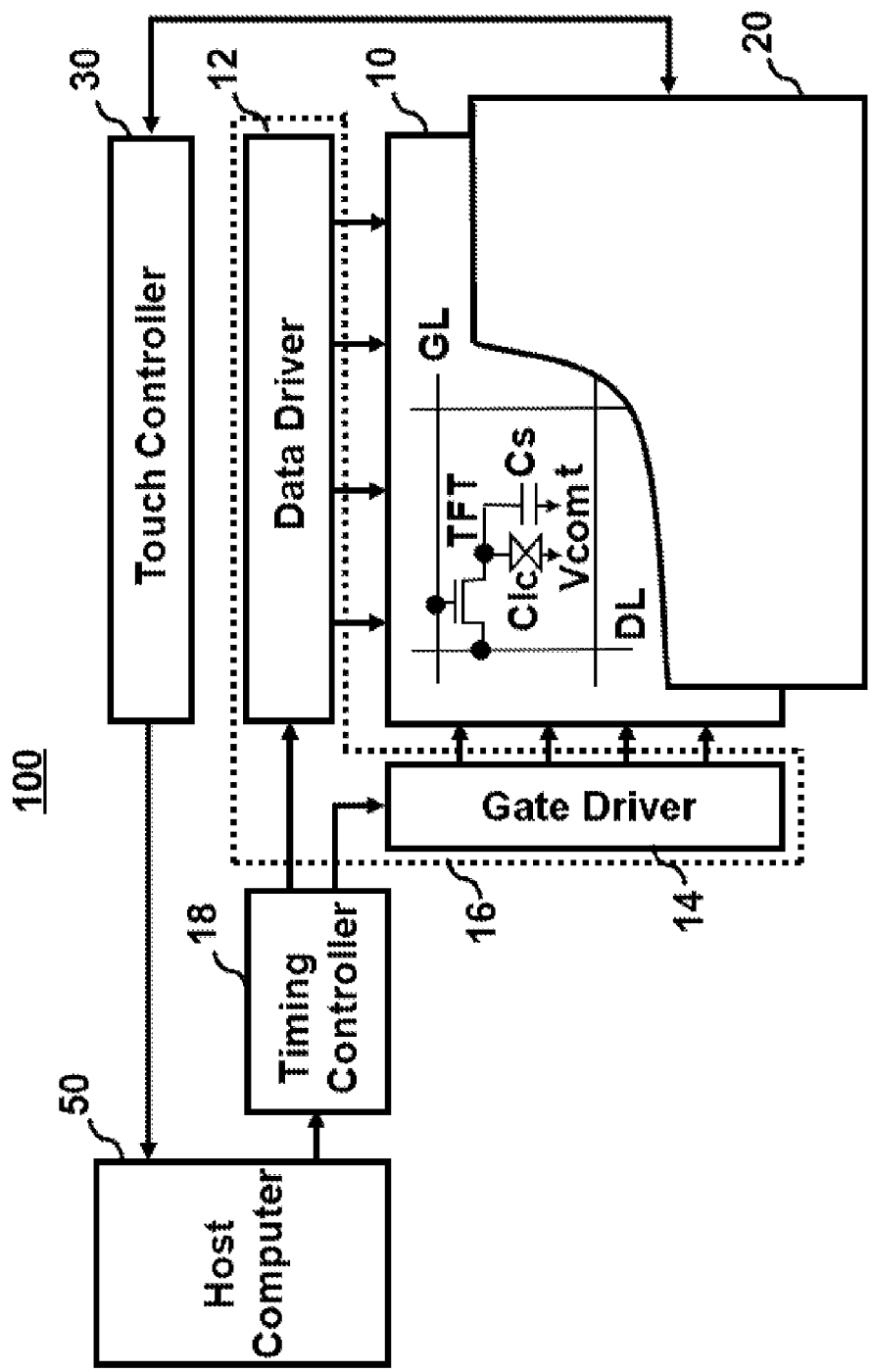
FIG. 1 illustrates a display device having a touch sensor in accordance with one embodiment.

FIG. 1 illustrates a block diagram of a display device 100 having a touch sensor in accordance with one embodiment. The display device 100 comprises a display panel 10, a panel driver 16 including a data driver 12 and a gate driver 14 for driving the display panel 10, a timing controller 18 for controlling the panel driver 16, a touch sensor 20 coupled to the display panel 10, and a touch controller 30 for driving the touch sensor 20. The timing controller 18 and the touch controller 30 are coupled to a host computer 50.

The timing controller 18 and the data driver 12 may be integrated into respective integrated circuits (ICs) or the timing controller 18 may be integrated into an IC incorporated in the data driver 12. The touch controller 30 and the timing controller 18 may be integrated into respective ICs, or the touch controller 30 may be integrated into an IC incorporated in the timing controller 18.

The display panel 10 includes a pixel array having an array of pixels. The pixel array displays graphic user interfaces (GUIs) and other images including a pointer or a cursor. The display panel 10 may be a flat display panel such as a liquid crystal display panel (hereafter, a "liquid crystal panel"), a plasma display panel, and an organic light emitting diode display panel. In the description herein, the display panel 10 is described as a liquid crystal panel. However, other types of display panels may be used in different embodiments.

The display panel 10 may include a color filter substrate having a color filter array formed on the color filter substrate, a thin film transistor (TFT) substrate having a thin film transistor array formed on the TFT transistor, a liquid crystal layer between the color filter substrate and the TFT substrate, and a polarizing plate attached to the outside of the color filter substrate and the TFT substrate.

The display panel 10 displays an image with the pixel matrix having an array of pixels arranged on the panel 10. Each of the pixels produces a desired color by a combination of red, green, and blue sub-pixels each of which varies an orientation of the liquid crystals with a data signal to adjust light transmissivity. Each of the sub-pixels has a thin film transistor TFT connected to a gate line GL and a data line DL, a liquid crystal capacitor Clc and a storage capacitor Cst connected to the thin film transistor TFT in parallel. The liquid crystal capacitor Clc charges a difference voltage between the data signal supplied to the pixel electrode through the thin film transistor TFT and a common voltage Vcom supplied to the common electrode, and drives the liquid crystals according to the charged voltage to adjust the light transmissivity. The storage capacitor Cst sustains the voltage charged in the liquid crystal capacitor Clc. The liquid crystal layer may be driven in a Twisted Nematic (TN) mode, or a Vertical Alignment (VA) mode which uses a vertical electric field, or an In-Plane Switching (IPS) mode or a Fringe Field Switching (FFS) mode, which uses a horizontal electric field.

In one embodiment, the data driver 12 supplies image data from the timing controller 18 to the plurality of data lines DL at the display panel 10 in response to data control signals from the timing controller 18. The data driver 12 receives and converts digital data from the timing controller 18 into a positive/negative analog data signals by using a gamma voltage generator and supplies the data signal to the data lines DL every time the gate lines GL are driven. The data driver 12 is at least a data IC mounted to a circuit film, such as tape carrier package (TCP) film, chip-on-film (COF), and flexible printed circuit (FPC) film, which is in turn attached to the display panel 10 by tape automatic bonding (TAB) or mounted to the display panel 10 by chip on glass (COG).

The gate driver 14 drives the plurality of gate lines GL formed at the thin film transistor array of the display panel 10 in response to gate control signals from the timing controller 18. The gate driver 14 supplies a scan pulse corresponding to the gate on-voltage at every scan period of a gate lines GL, and supplies a gate off-voltage to the gate line GL during other periods in which other gate lines GL are driven. The gate driver 14 is at least a data IC mounted to a circuit film, such as TCP, COF, and FPC, which is in turn attached to the display panel 10 by TAB, or mounted to the display panel 10 by COG. Alternatively, the gate driver 14 may be formed on the thin film transistor substrate together with the pixel array, built in the display panel 10 by Gate-In-Panel (GIP).

The timing controller 18 performs various signal processes to image data from the host computer 50 and supplies the processed image data to the data driver 12. For an example, in order to improve response speed of the liquid crystals, the timing controller 18 may correct the image data by overdriving the image data in which an overshoot value or an undershoot value is added to the image data depending on a data difference between adjacent frames and forwards the corrected data to the data driver 12.

The timing controller 18 generates the data control signals which control drive timing of the data driver 12 and the gate control signals which control drive timing of the gate driver 14 by using a plurality of synchronizing signals from the host computer 50. The timing controller 18 forwards the data control signals and the gate control signals, respectively, to the data driver 12 and the gate driver 14. In one embodiment, the data control signals include a source start pulse and a source sampling clock which control latching of the data signal, a polarity control signal for controlling polarity of the data signal, and a source output enable signal which controls the output period of the data signal. The gate control signals may include a gate start pulse and a gate shift clock which control scanning of the gate signal and a gate output enable signal which controls an output period of the gate signal. The timing controller 18 forwards the synchronizing signals (e.g., Vertical synchronizing signal Vsync and Horizontal synchronizing signal Hsync) and so on to the touch controller 30 for controlling drive timing of the touch controller 30 such that the drive timing of the display panel 10 interlocks with the drive timing of the touch sensor 20.

In one embodiment, the touch sensor 20 senses when a user contacts or touches the touch sensor 20 to enable the user to communicate with the GUI displayed on the display panel 10. In one embodiment, the touch sensor 20 is a capacitive type touch sensor which senses a change of capacitance that occurs as a small amount of charge that moves to a touched point when a conductive body, such as a human body or a stylus, touches the touch sensor 20. The touch sensor 20 may be attached to the display panel 10 or built in the pixel array of the display panel 10.

Figure 2:
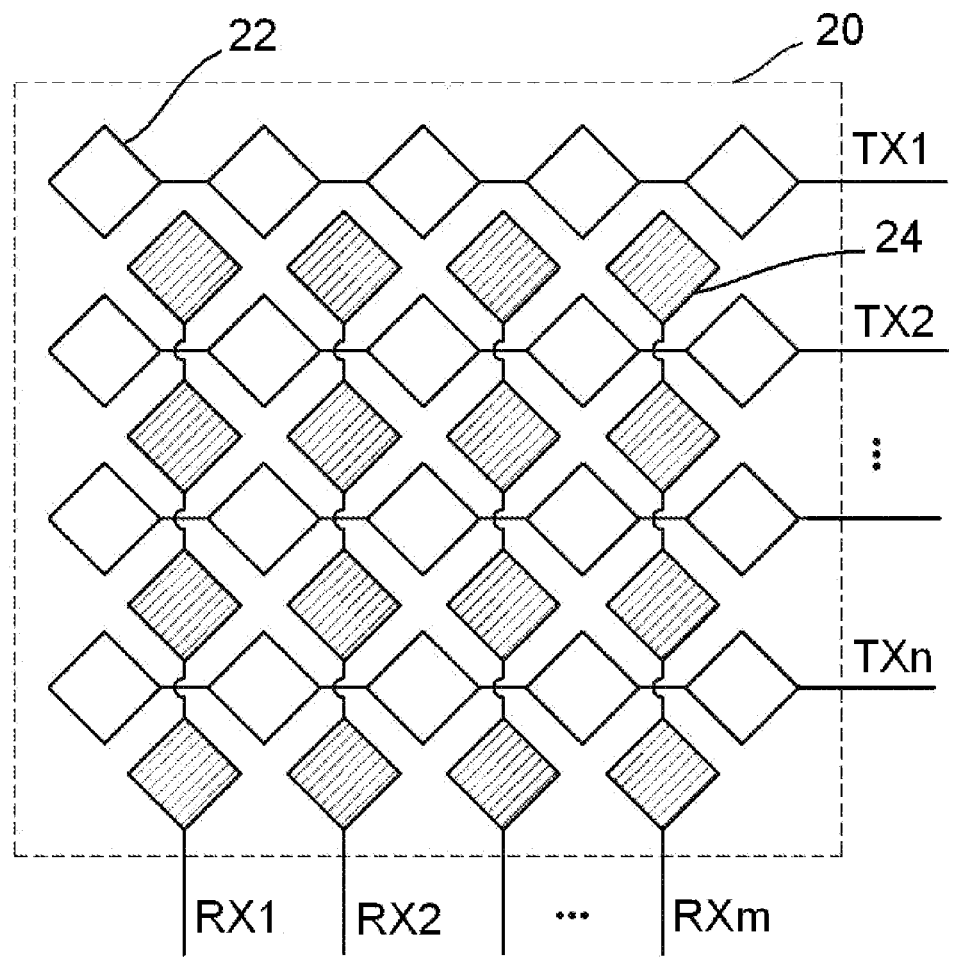
FIG. 2 illustrates a detailed view of a touch sensor in accordance with one embodiment.

Referring to FIG. 2, a detailed view of a touch sensor 20 is shown. In the example illustrated in FIG. 2, the capacitive type touch sensor 20 is attached to the display panel 10. The touch sensor 20 comprises a plurality of scan lines (or transmission lines) TX1, TX2, through TXn having a plurality of first sensing electrodes 22 arranged in a width (i.e. horizontal) direction connected electrically. The touch sensor 20 further comprises a plurality of readout lines (or reception lines) RX1, RX2, through RXm having a plurality of second sensing electrodes 24 arranged in a length (i.e., vertical) direction connected electrically.

In one embodiment, the first sensor electrodes 22 and the second sensing electrodes 24 are diamond shapes but other shapes may be used in different embodiments. The first sensing electrodes 22 and the second sensing electrodes 24 are driven by the touch controller 30 to form capacitance with the fringe field, and to form a capacitor with a conductive touch body which touches the touch sensor 20 to change the capacitance. The first sensor electrodes 22 and the second sensing electrodes 24 forward a readout signal which indicates whether a user has touched the touch sensor 20 to the touch controller 30. That is, the sensing electrodes indicate whether the touch sensor 20 has been touched.

The touch controller 30 supplies a drive signal to the scan lines TX1 through TXn of the touch sensor 20. The touch controller 30 determines whether a touch is made or not for each sensing electrode based on the readout signal from the readout lines RX1 through RXm. The touch controller 30 calculates the number of touches on the touch sensor 20 and their corresponding touch coordinates and supplies the information to the host computer 50. Particularly, the touch controller 30 groups binary raw data on adjacent touch electrodes having the touches and labels the raw data as one touch region. In one embodiment, the binary raw data indicates whether an electrode has been touched. The touch controller 30 perceives the labeled touch regions as individual touch regions in multi-touches and calculates the touch coordinates of each of the touch regions. By assigning a lowest label data comprising a lowest value, among the values of adjacent label data, to adjacent raw data and a target raw data in the touch region labeling, the touch controller 30 can label the touch region by grouping adjacent raw data during a single scanning of the raw data. In one embodiment, scanning of raw data describes retrieving the raw data to identify the corresponding values associated with the raw data. Herein, single scanning of the raw data describes designating a cell as a target cell of a scanning mask only once as will be further described below.

According to this, since secondary labeling for making equivalent labeling is not required, the time required to label the touch region may be shortened. Furthermore, since intermediate preliminary labeled data is not required, memory size for storing the labeled data can be reduced.

In one embodiment, the host computer 50 supplies the image data and the plurality of synchronizing signals to the timing controller 18. The host computer 50 analyzes the touch coordinates from the touch controller 30 to perform an order of the touch by the user.

Figure 3:
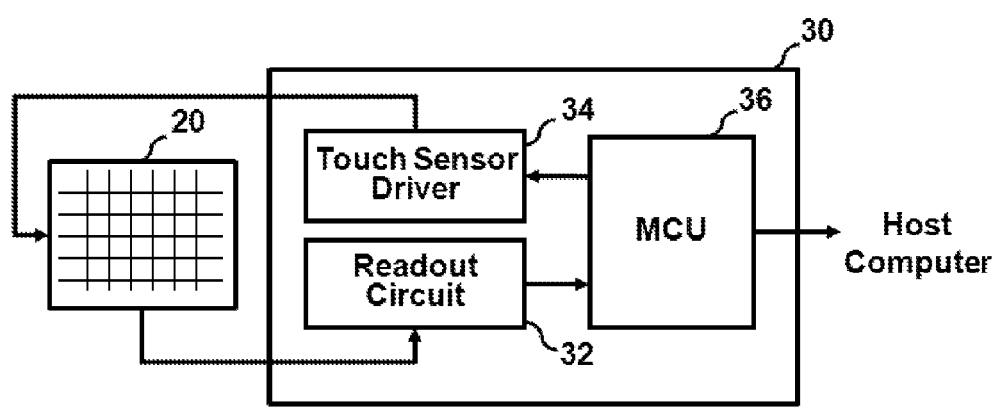
FIG. 3 illustrates a detailed view of a touch sensor drive device in accordance with one embodiment.

FIG. 3 illustrates a detailed view of a touch sensor drive device in accordance with one embodiment. The touch controller 30 is connected (i.e., coupled) to the touch sensor 20 and includes a readout circuit 32, a touch sensor driver 34, and a microcontroller unit (MCU) 36 (i.e., a computer processor). The touch sensor driver 34 supplies a driving pulse to the scan lines TX1 through TXn at the touch sensor 20 in response to control of the MCU 36.

The readout circuit 32 detects raw (i.e., analog) data from each touched electrode every time the drive pulse is supplied to the scan lines TX1 through TXn of the touch sensor 20 by using the readout signal from the readout lines RX1 through RXm. The readout circuit 32 comprises a sensing unit (e.g., an amplifier) and an analog-to-digital converter (ADC). The amplifier compares the readout signal from the touch sensor 20 to a reference voltage and the amplifier amplifies the readout signal to a voltage higher than the reference voltage and forwards the amplified voltage as the sensing signal. The ADC converts the analog sensing signal from the sensing unit into digital raw data and forwards the digital raw data to the MCU 36.

The MCU 36 (e.g., a signal processor) determines whether the touch sensor 20 has been touched (i.e., whether a touch is made or not) and the number of touches that were made using the raw data from the readout circuit 32. The MCU 36 calculates the coordinates corresponding to the touches and supplies the touched coordinates to the host computer 50. In one embodiment, the MCU 36 groups adjacent touch nodes that have been touched into a touch region, labels the touch region, and calculates the touch coordinates of each of the labeled touch regions. By assigning a lowest label value, among the adjacent label values, to adjacent touch nodes and a target touch node, the MCU 36 can group the touch nodes into touch regions and label the touch regions during a single scanning of the binary raw data.

In one embodiment, the MCU 36 compares the raw data of each touch node from the readout circuit 32 to a preset reference value and, as shown in FIG. 4, converts an indication whether a touch is made or not for each touch node into a label such as binary raw data (i.e., a binary label) and stores the binary raw data. For example, a binary label "0" indicates that the node has not been touched (i.e., no touch) and a binary label "1" indicates that the node has been touched (i.e., touched). The frame of binary raw data shown in FIG. 4 describes nodes of the touch sensor 20 that have been touched.

Figures 5A, 5B, 5C:
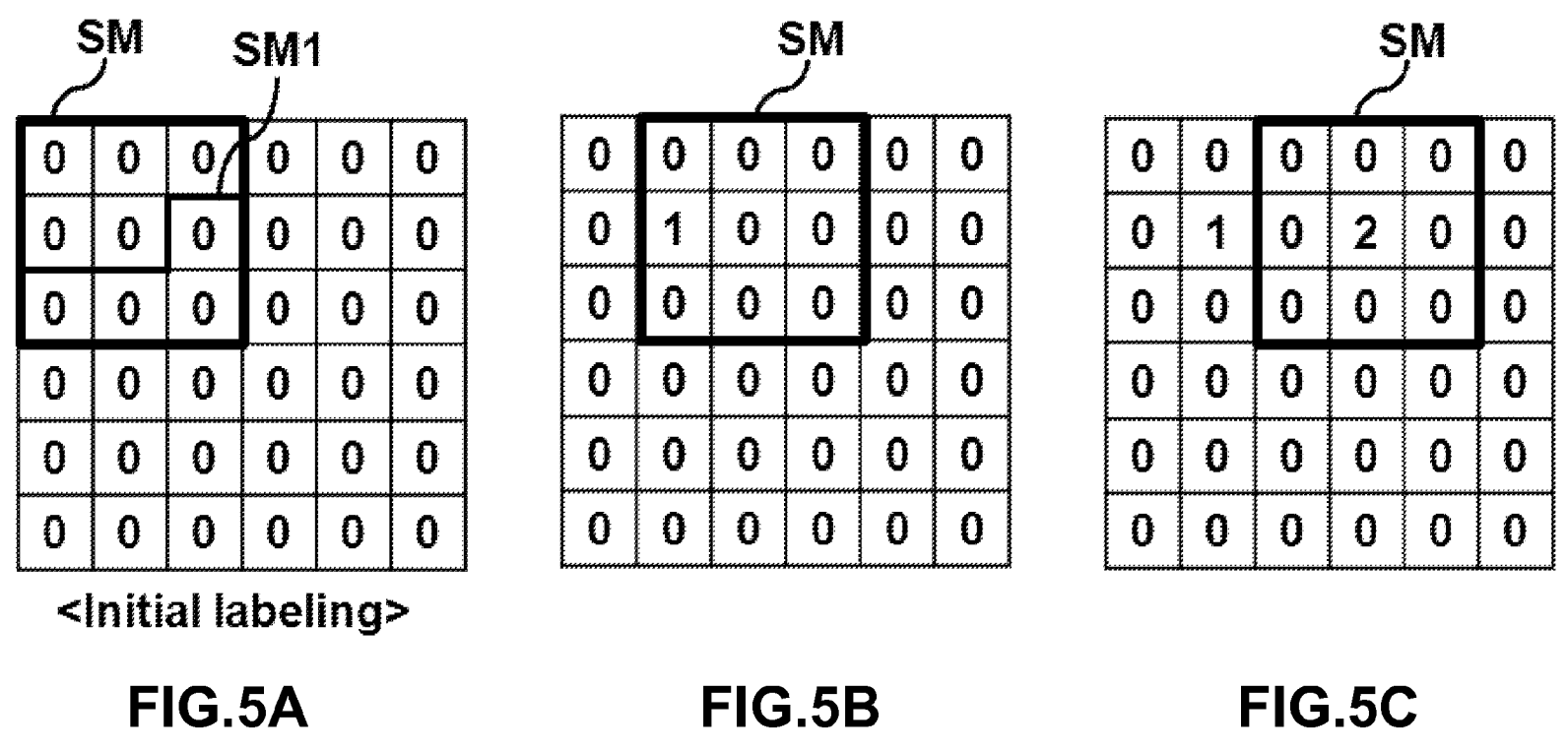

Referring to FIG. 5, a touch region labeling process is illustrated in accordance with one embodiment. FIG. 5A illustrates the initial labeling of the frame of the binary raw data shown in FIG. 4. As shown in FIG. 5A, MCU 36 initially assigns label data of "0" to each node of the touch sensor 20. Note that each node is associated with a corresponding binary raw data from FIG. 4.

Generally, the MCU 36 scans a frame of the labels of binary raw data with a scanning mask SM in succession and assigns label data to the binary raw data on each touch node that is a target of the scanning mask SM. The label data has a data size that is the same size as the raw data. The scanning mask SM may have a mask size of N×M (where, N and M are the same or are different positive integers) cells. The scanning mask SM may have a mask size of cells including a center cell (i.e., a target cell) and a plurality of cells that are analyzed before the center cell in the N×M cells is scanned. The cells of the scanning mask match with the raw data respectively, and the center cell matches to the target raw data.

For an example, the scanning mask may be, but not limited to, a 3×3 mask size illustrated as SM in FIG. 5A or a mask SM1 whose mask size includes the one center cell (Target cell) and four cells that are analyzed before the center cell in the 3×3 cells. In the description of FIGS. 5B through 5F, scanning mask SM is used.

The scanning mask SM analyzes the binary raw data of each cell that is adjacent to the target cell located at the center of the scanning mask SM. While scanning the binary raw data with the scanning mask SM in succession, the MCU 36 assigns label data to the binary raw data matched to the target cell that is being scanned when the target cell (i.e., the center cell) of the scanning mask SM comprises a binary label of "1" indicating the target cell has been touched from FIG. 4. The label data is assigned starting from a lowest value, such as "1, 2, 3, - - - , and n (n is a positive integer)" in succession. The MCU 36 assigns label data to the binary raw data of each touch node while scanning a first horizontal line data in a direction towards the right starting from a left top side of the first binary raw data in succession. In one embodiment, the scanning mask SM moves a single cell from its current position during scanning until all cells of a row have been scanned as a target cell. Alternatively, the scanning mask SM moves two or more cells during scanning until all cells of a row have been covered by the scanning mask SM. Generally, the scanning mask may move a number of cells that is less than a width of the scanning mask SM. The MCU 36 repeats the scanning process for each horizontal line until all the horizontal lines have been scanned and assigned label data.

Particularly, if a cell adjacent to the target cell within the scanning mask SM has a label data equal to or greater than "1", the MCU 36 assigns the label data from the adjacent cell to the target cell. If the cell adjacent to the target cell within the scanning mask SM lacks label data equal to or greater than "1" (i.e., the label data is less than "1"), the MCU 36 assigns label data associated with an increasing value to the target cell. In this instance, if the first and second label data having target cells are different from each other and are adjacent to each other within the scanning mask SM, the first label data having the lowest value is given to the raw data on the target cell and the adjacent second label data is also updated with the first label data which has the lowest value.

For example, in FIG. 5A, the binary label data from FIG. 4 that is associated with the target cell (i.e., the center cell of the scanning mask SM) of FIG. 5A indicates that the target cell has been touched. Thus, MCU 36 assigns label data to the target cell based on label data of adjacent cells in the scanning mask SM. The label data of the cells adjacent to the target cell in the scanning mask SM are analyzed to identify if they comprise label data equal to or greater than "1." However, the label data of the adjacent cells in FIG. 5A comprise label data of value "0." Thus, the label data associated with the target cell of FIG. 5A is changed from "0" to "1" as illustrated in FIG. 5B.

In FIG. 5B, the scanning mask SM sequentially moved to the next target cell in the row during the single scanning of the binary raw data and the label data of the nodes of the touch sensor 20. Note that in one embodiment, moving the scanning mask SM sequentially includes moving the scanning mask SM by one or more cells such that each cell is covered by the scanning mask SM at least once. In alternative embodiments, the scanning mask SM may move in a non-linear sequence such that label data corresponding to the edge of the previous position of the scanning mask SM is covered by the scanning mask SM. For example the scanning mask SM may move in an irregular pattern.

Referring to FIG. 5B, the binary raw data associated with the target cell in FIG. 5B indicates that the target cell has not been touched. Accordingly, the label data associated with the target cell of FIG. 5B is not changed. This is, the label data for the target cell of FIG. 5B is left with a value of "0".

The scanning mask SM then moves to the next adjacent cell in the row as shown in FIG. 5C for scanning. The binary raw data from FIG. 4 that is associated with the target cell of FIG. 5C indicates that the target cell has been touched. Accordingly, MCU 36 assigns label data to the target cell. Because the target cell has been touched, the label data of the adjacent cells in the scanning mask SM are analyzed to identify if they comprise label data equal to or greater than "1." However, the label data of the adjacent cells comprise label data of "0". Accordingly, the label data associated with the target cell of FIG. 5C is updated with the next available label data of "2"

since the label of "1" has already been used to label the target cell of FIG. 5A. This process is repeated for the remaining cells in the row.

In FIG. 5D, the binary raw data from FIG. 4 that is associated with the target cell of FIG. 5D indicates that the target cell has been touched. Accordingly, MCU 36 must assign label data to the target cell. The label data of the cells adjacent to the target cell in the scanning mask SM are analyzed to identify if they comprise label data equal to or greater than "1". The analysis indicates that the cell directly above the target cell comprises a label data of "1". Accordingly, the MCU 36 assigns the label data from the adjacent cell to the target cell. Thus, the target cell is assigned label data of "1". As previously mentioned above, if a cell adjacent to the target cell within the scanning mask SM has label data equal to or greater than "1", MCU 36 assigns the label data from the adjacent cell to the target cell.

The scanning mask SM then moves to the next adjacent cell in the row as shown in FIG. 5E. The binary label data from FIG. 4 that is associated with the target cell of FIG. 5E indicates that the target cell has been touched. Thus, MCU 36 assigns label data to the target cell. The label data of the cells adjacent to the target cell in the scanning mask SM are analyzed to identify if they comprise label data equal to or greater than "1." The analysis indicates that the cell directly to the left of the target cell and the cell directly to the upper-left of the target cell both comprise label data of "1." Furthermore, the analysis indicates that the cell directly to the upper-right of the target cell comprises label data of "2". In one embodiment, if the label data "1" and the label data "2" are adjacent to the target cell within the scanning mask SM, the label data associated with the smallest value is assigned to the target cell. Accordingly, label data "1" is assigned to the raw data on the target cell. As shown in FIG. 5E, the label data of the target cell is updated to "1".

Furthermore, if the label data "1" and the label data "2" are adjacent to the target cell within the scanning mask SM, the adjacent label data with the higher value is updated with the label data of the lower value. As shown in FIG. 5F, the cell that was previously labeled "2" has been updated to have label data of "1". Thus, the MCU 36 updates the higher label data with the value of the lower label data. Accordingly, only during a single scanning of the binary raw data, label data are assigned to adjacent raw data having the touch, enabling the touch group to be perceived as a same touch region. That is, MCU 36 may assign label data to nodes of the touch sensor 20 and update the label data during a single scanning of the binary raw data.

Figures 6A, 6B:
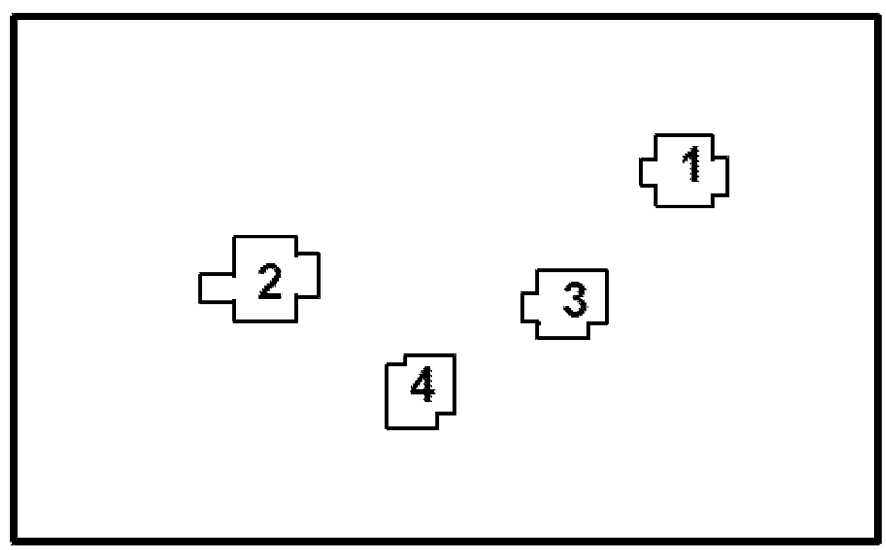
FIGS. 6A and 6B illustrate diagrams showing a result of a touch region labeling in accordance with one embodiment.

Referring to FIG. 6A, as the same label data is assigned to a plurality of adjacent raw data having the touch, the adjacent raw data are grouped as a single touch region. Other raw data which are not adjacent are assigned a different label data and are grouped as a different touch region. For example, FIG. 6A illustrates a first touch region 61 associated with label data "1" and a second touch region 62 associated with label data "2". As shown in FIG. 6B, as a result of the labeling, label data 1 through 4 are different from one another and are assigned to their respective touch regions. Individual touch regions as many as a number of touched fingers can be detected even when multi-touches occur. The MCU 36 calculates and forwards the coordinates of each touch region to the host computer 50.

Figure 7:
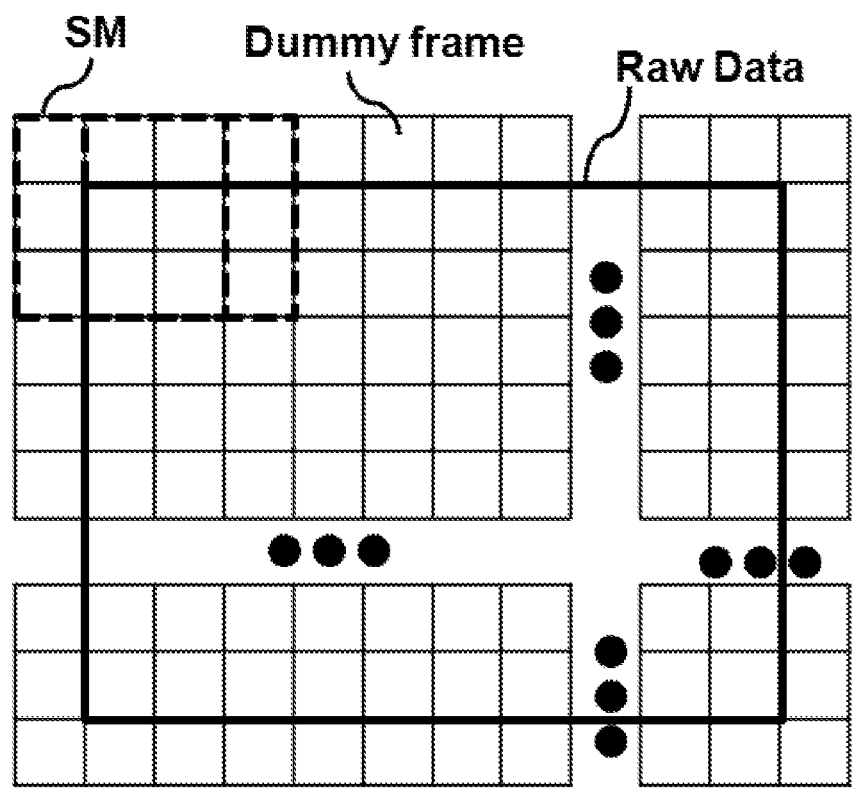
FIG. 7 illustrates dummy frame data added to a raw data frame in accordance with one embodiment.

As previously mentioned, the scanning mask SM may be a fixed size. In order to use the scanning mask SM for label data assigned to data positioned at edges of one frame of the binary raw data, as shown in FIG. 7, dummy frame data is added to the binary raw data. The dummy frame data comprises a label data "0" that are assigned to edges of the frame of the binary raw data. That is, each cell of the dummy frame is assigned label data "0" since the cells of the dummy frame do not correspond to cells of the touch sensor 20. In one embodiment, the edges of the frame of the binary raw data correspond to the boundary of the touch sensor 20.

Figure 8:
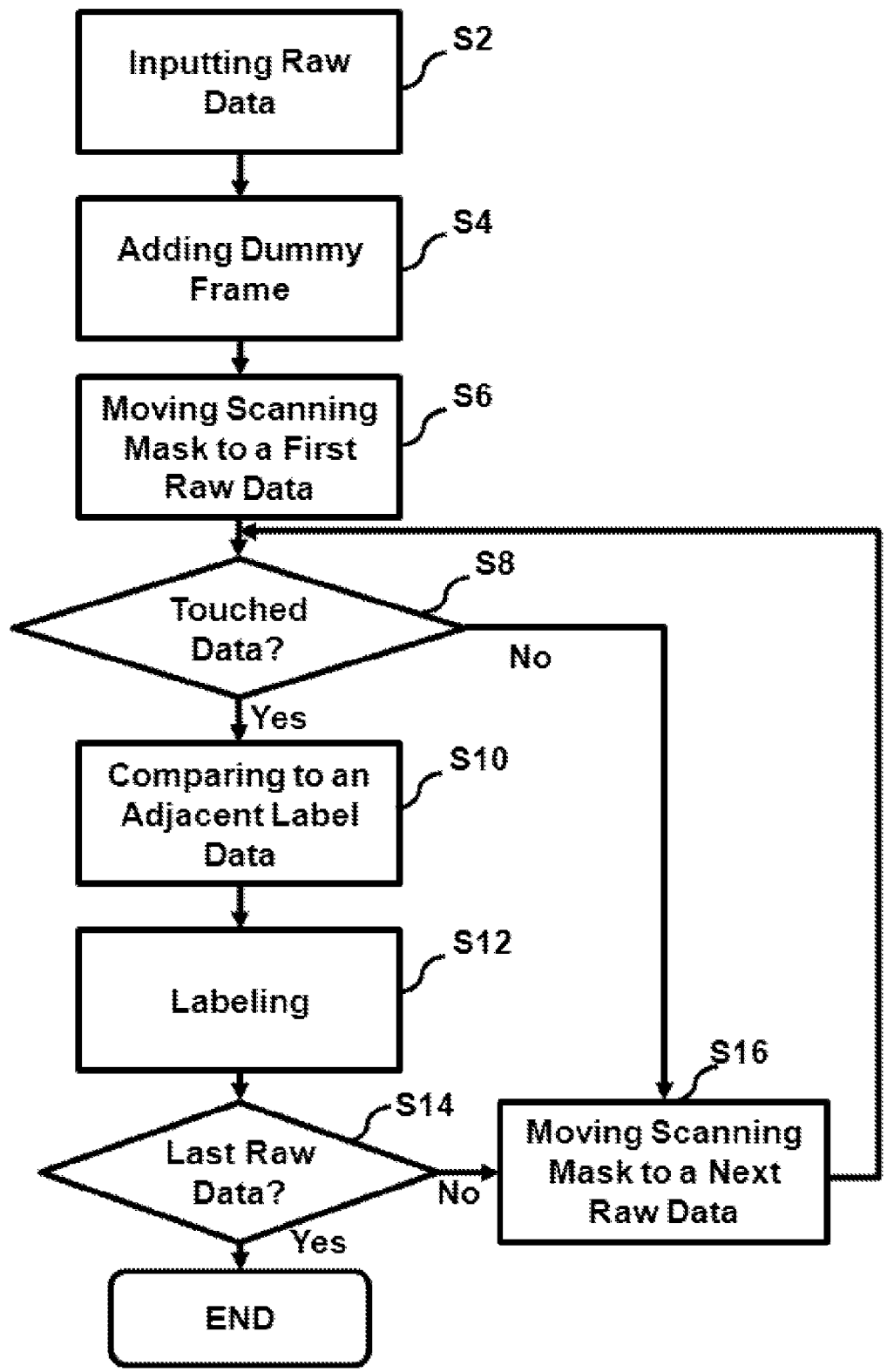
FIG. 8 illustrates a method flow diagram for labeling a touch region in accordance with one embodiment.

FIG. 8 illustrates a flowchart for labeling a touch region in accordance with one embodiment. The method may be performed by the MCU 36 in FIG. 3. Note that other steps other than those illustrated in FIG. 8 may be performed in alternative embodiments.

The MCU 36 inputs S2 one frame of binary raw data on each touch node which indicates whether a touch is made or not, and the MCU 36 adds S4 dummy frame data to edges of a raw data frame as shown in FIG. 7 for application of the same scanning mask SM and stores the raw data frame having the dummy frame data added thereto. That is, the binary raw data including the dummy frame data is stored. For an example, though the scanning mask SM may have a 3×3 mask size, or a mask size of 5 cells including one center cell (Target cell) and four cells that are analyzed before the center cell of the 3×3 cells, the scanning mask SM is not limited to above. In the scanning mask SM, each cell matches the binary raw data on each touch node.

The MCU 36 matches S6 the target cell (i.e., the center cell) of the scanning mask SM to a first binary raw data. The MCU 36 determines S8 whether the target cell is at a touched data 1 or not. If it is determined that the target cell is a touched cell 1 in the step S8 (Yes), the MCU 36 compares S10 label data on adjacent cells within the scanning mask SM. If it is determined that the target cell is at a no touch cell 0 in the step S8 (No), the MCU 36 moves S16 the target cell of the scanning mask SM to a next raw data and determines whether the next raw data indicates whether the raw data is a touched cell 1 or a non-touched cell 0.

If the MCU 36 does not identify adjacent label data within the scanning mask SM in step S10, the MCU 36 assigns S12 label data starting from a lowest value "1" to the target raw data in increasing fashion. If the MCU 36 finds that a cell adjacent to the target cell within the scanning mask SM that has a label data having 1 or larger than 1 assigned in step S10, the MCU 36 assigns the same label data as the label data of the cell adjacent to the target cell. If the MCU 36 does not find a cell adjacent to the target cell within the scanning mask SM that has a label data having a label of 1 or larger in the step S10, the MCU 36 assigns a next label data to the target cell. In this instance, if the target cell is adjacent to cells within the scanning mask SM that comprise first label data and second label data that are different from each, the MCU 36 assigns the first label data, which has the lowest value of the first label data and the second label data, to the raw data on the target cell. The adjacent second label data is also updated with the first label data which is the lowest value.

If the target cell is not S14 located a last raw data (No) of a raw in the data frame, the MCU 36 moves the target cell of the scanning mask SM to a next raw data, and repeats steps S8 to S14 described before.

Thus, the method for labeling a touch region and a device for driving a touch sensor groups raw data on adjacent touch nodes into a touch region, labels the touch region as the same touch region, and gives other label data to other raw data to group the other raw data as other touch regions. Particularly, at the time of the touch region labeling, by assigning a lowest label data to adjacent raw data and the target aw data, the adjacent raw data can be grouped and labeled as the touch region during a single scanning of the raw data. Accordingly, since the second labeling required for equivalent labeling in the related art is not required, a touch region labeling time can be shortened, and since the intermediate first label data are not required, a memory size for storing the label data can be reduced.

It will be apparent to those skilled in the art that various modifications and variations can be made in the embodiments disclosed herein without departing from the spirit or scope of the invention. Thus, it is intended that the various embodiments herein covers the modifications and variations of the invention provided they come within the scope of the appended claims and their equivalents.

What is claimed is:

1. A computer-implemented method for labeling a touch region of a display device, the method comprising:
   receiving raw data of nodes of a touch sensor capable of detecting a plurality of distinct regions that are touched, each raw datum indicating whether an associated node has been touched;
   assigning label data to nodes that have been touched based on the raw data and based on label data of adjacent nodes during a single scanning of the label data; and
   grouping the labeled nodes into one or more touch regions based on the assigned label data,
   wherein said assigning step comprises, assigning label data to a target node that has been touched;
   identifying a first node that is adjacent to a target node, the first node comprising first label data associated with a first value;
   identifying a second node that is adjacent to the target node, the second node comprising second label data associated with a second value that is greater that the first value of the first label data; and
   assigning the first label data to the target node.

2. The computer-implemented method of claim 1, wherein assigning the label data to the nodes comprises:
   for a target node indicated by the raw data as being touched, assigning first label data to the target node responsive to an adjacent node of the target node previously assigned with the first label data; and
   assigning alternatively second label data to the target node responsive to any of nodes adjacent to the target node not previously assigned with a label data, the second label data indicative of a different touch region relative to the first label data.

3. The computer-implemented method of claim 1, further comprising:
   calculating coordinates associated with the one or more touch regions.

4. The computer-implemented method of claim 1, further comprising:
   assigning initial values to the label data of the nodes of the touch sensor.

5. The computer-implemented method of claim 1, further comprising:
   updating the second label data of the second node with the first value of the first label data.

6. The computer-implemented method of claim 1, wherein the label data comprises a memory size that is the same as a memory size of the raw data.

7. The computer-implemented method of claim 1, further comprising:
   applying a scanning mask to the raw data, the scanning mask comprising a mask size.

8. The computer-implemented method of claim 7, wherein applying the scanning mask comprises:
   moving the scanning mask for a predetermined number of cells that is less than a width of the scanning mask.

9. The computer-implemented method of claim 7, wherein applying the scanning mask comprises:
moving the scanning mask in a non-linear sequence.

10. The computer-implemented method of claim 7, wherein the mask size of the scanning mask comprises a mask size of N by M cells where N and M are positive integers and wherein a cell located at the center of the scanning mask is associated with a target cell of the scanning mask.

11. The computer-implemented method of claim 7, wherein the mask size of the scanning mask comprises a plurality of cells that are analyzed in the scanning mask prior to scanning of a target cell.

12. A computer-implemented method for labeling a touch region of a display device, the method comprising:
receiving raw data of nodes of a touch sensor capable of detecting a plurality of distinct regions that are touched, each raw datum indicating whether an associated node has been touched;
assigning label data to nodes that have been touched based on the raw data and based on label data of adjacent nodes during a single scanning of the label data;
grouping the labeled nodes into one or more touch regions based on the assigned label data; and
adding additional raw data associated with nodes located at edges of the touch sensor, the additional raw data indicating that associated nodes have not been touched.

13. A touch controller comprising:
a touch sensor comprising nodes; and
a computer processor configured to:
receive raw data of the nodes of the touch sensor capable of detecting a plurality of distinct regions that are touched, each raw datum indicating whether an associated node has been touched;
assign label data to nodes that have been touched based on the raw data and based on label data of adjacent nodes during a single scanning of the label data; and
group the labeled nodes into one or more touch regions based on the assigned label data,
wherein the computer processor is further configured to:
identify a first node that is adjacent to a target node that has been touched, the first node comprising first label data associated with a first value;
identify a second node that is adjacent to the target node, the second mode comprising second label data associated with a second value that is greater that the first value of the first label data;
assign the first label data to the target node; and
update the second label data of the second node with the first value of the first label data.

14. The touch controller of claim 13, wherein the computer processor is further configured to:
for a target node indicated by the raw data as being touched, assign first label data to the target node responsive to an adjacent node of the target node previously assigned with the first label data; and
assign alternatively second label data to the target node responsive to any of nodes adjacent to the target node not previously assigned with a label data, the second label data indicative of a different touch region relative to the first label data.

15. The touch controller of claim 13, wherein the computer processor is further configured to:
assign initial values to the label data of the nodes of the touch sensor.

16. The touch controller of claim 13, wherein the computer processor is further configured to:
apply a scanning mask to the raw data, the scanning mask comprising a mask size.

17. The touch controller of claim 16, wherein the mask size of the scanning mask comprises a mask size of N by M cells where N and M are positive integers and wherein a cell located at the center of the scanning mask is associated with a target cell of the scanning mask.

18. A touch controller comprising:
a touch sensor comprising nodes; and
a computer processor configured to:
receive raw data of the nodes of the touch sensor capable of detecting a plurality of distinct regions that are touched each raw datum indicating whether an associated node has been touched;
assign label data to nodes that have been touched based on the raw data and based on label data of adjacent nodes during a single scanning of the label data; and
group the labeled nodes into one or more touch regions based on the assigned label data,
wherein the computer processor is further configured to add additional raw data associated with nodes located at edges of the touch sensor, the additional raw data indicating that associated nodes have not been touched.

* * * * *